United States Patent
Asada et al.

(10) Patent No.: US 7,188,473 B1
(45) Date of Patent: Mar. 13, 2007

(54) SHAPE MEMORY ALLOY ACTUATOR SYSTEM USING SEGMENTED BINARY CONTROL

(75) Inventors: Harry Haruhiko Asada, Lincoln, MA (US); Kyu-Jin Cho, Cambridge, MA (US); Brian Selden, Boston, MA (US)

(73) Assignee: Harry HaruRiko Asada, Lincoln, MA (US)

( * ) Notice: Subject to any disclaimer, the term of this patent is extended or adjusted under 35 U.S.C. 154(b) by 61 days.

(21) Appl. No.: 11/114,504

(22) Filed: Apr. 26, 2005

Related U.S. Application Data (60) Provisional application No. 60/565,350, filed on Apr. 26, 2004.

(51) Int. Cl.
F01B 29/10 (2006.01)
(52) U.S. Cl. .............. 60/527; 60/528; 310/306
(58) Field of Classification Search ............. 60/527, 60/528; 310/306, 309; 977/762, 763, 765, 977/766, 767, 768, 769, 770, 771, 772, 764
See application file for complete search history.

(56) References Cited

U.S. PATENT DOCUMENTS

| | | | | |
|---|---|---|---|---|
| 4,553,393 | A | 11/1985 | Ruoff | 60/528 |
| 5,624,380 | A * | 4/1997 | Takayama et al. | 600/146 |
| 5,763,979 | A * | 6/1998 | Mukherjee et al. | 310/306 |
| 6,133,547 | A | 10/2000 | Maynard | 219/209 |
| 6,162,171 | A * | 12/2000 | Ng et al. | 600/141 |
| 6,272,857 | B1 * | 8/2001 | Varma | 60/527 |
| 6,574,958 | B1 | 6/2003 | MacGregor | 60/527 |

FOREIGN PATENT DOCUMENTS

| | | | |
|---|---|---|---|
| JP | 01069269 A | * | 3/1989 |
| JP | 06315280 A | * | 11/1994 |

OTHER PUBLICATIONS

Otsuka, K., et al., *Shape Memory Materials*, Cambridge University Press, 1998, pp. 174-178.
Hunter, I., et al., "Fast Reversible NiTi Fibers for Use in MicroRobotics," *IEEE*, 1991, pp. 166-170.
Ikuta, K., et al., "Shape Memory Alloy Servo Actuator System with Electric Resistance Feedback and Application for Active Endoscope," *IEEE*, 1988, pp. 427-430.

(Continued)

*Primary Examiner*—Hoang Nguyen (57) ABSTRACT

An architecture shape memory alloy (SMA) actuators is presented called Segmented Binary Control (SBC). Instead of controlling the phase transition of the entire SMA wire as a single plant, we divide the SMA wire into many segments, each of which is controlled separately as an ON-OFF finite-state process. SBC produces a displacement as the addition of small displacements generated by the individual segments. Furthermore, the segmented architecture of SMA wires is extended to a multi-axis actuator array by arranging them in a two-dimensional array, so that the multi-axis control may be streamlined and coordinated. Moreover, the 2-D segmentation can be so designed that coordinated gross motion as well as independent fine movements may be generated with minimum complexity and minimum control loops.

20 Claims, 10 Drawing Sheets

OTHER PUBLICATIONS

Song, G., et al., "Precision Tracking Control of Shape Memory Alloy Actuators Using Neural Networks and a Sliding-Mode Based Robust Controller," *Smart Materials and Structures*, Institute of Physics Publishing, UK, v. 12, 2003, pp. 223-231.

Grant, D., et al., "Variable Structure Control of Shape Memory Alloy Actuators," *IEEE Control Systems*, Jun. 1997, pp. 80-88.

Khan, M., et al., "Thermoelectric SMA Actuator: Preliminary Prototype Testing," *Proceedings of SPIE*, v. 5054, 2003, pp. 147-155.

Shahin, A., et al. "Enhanced Cooling of Shape Memory Alloy Wires Using Semiconductor 'Heat Pump' Modules," *Journal of Intelligent Material Systems and Structures*, v. 5, Jan. 1994, pp. 95-104.

* cited by examiner

SHAPE MEMORY ALLOY ACTUATOR SYSTEM USING SEGMENTED BINARY CONTROL

CROSS REFERENCE TO RELATED APPLICATIONS

This application claims the benefit of Provisional Patent Application Ser. No. 60/565,350 Provisional App filed Apr. 26, 2004 "Segmented Binary Control Of Shape Memory Alloy Actuator Systems Using The Peltier Effect And Segmentation Architecture Of Multi-Axis SMA Array Actuator" by the present inventors.

FEDERALLY SPONSORED RESEARCH

The present invention was developed under grant number ISS-0322601 provided by the National Science Foundation. The United States Government has certain rights to this invention.

BACKGROUND OF INVENTION

1. Field of Invention

The present invention relates to linear actuators utilizing active materials, more specifically to shape memory alloy actuators for use in controlling the displacement of mechanical systems.

2. Prior Art

Modern, non-electromechanical actuators, such as Shape Memory Alloys (SMA) and Electroactive Polymer (EAP) Actuators, convert the source energy to mechanical energy based on inherent material properties that exhibit actuator functionality. Although these actuator materials have lots of possibilities, numerous difficulties persist in using them reliably and suitably as robot actuators. Shape Memory Alloy (SMA) actuators, for example produce the one of the highest stresses among all actuators that has ever been developed. Its maximum actuation stress of over 200 MPa is 570 times larger than the human muscle, and 25 times larger than the latest electroactive polymer actuators. Its energy density of over 100 Joule/$cm^3$ is 100 times larger than that of piezoelectrics. These high stress and energy density characteristics allow SMA actuators to be effectively used in various applications where space and weight constraints are critical design requirements. These include medical devices, robots, and smart structures.

Despite the tremendous actuation stress and energy density, SMA has highly complex nonlinear dynamics that limit applicability and utility to rather simple tasks. Controlling the displacement of SMA is not easy. In the past few decades a number of research groups have modeled the SMA thermo-mechanical behavior in order to accurately control the SMA. These include finite element methods based on the Galerkin method, Preisach approaches, and models based on thermodynamic principles and constitutive equations. Researchers also have attempted to compensate for these thermo-mechanical nonlinearities utilizing nonlinear control approaches: neural networks and a sliding mode based robust controller, neural fuzzy, dissipativity, and variable structure control. Despite these valuable research efforts, control of SMA is still difficult. Fundamental control performance, e.g. speed of response and disturbance rejection, is still limited even when complex models and sophisticated controls are used.

The fundamental difficulties of SMA control include:

The phase transition diagram shows a prominent hysteresis with transitional regions that are both steep and nonlinear.

The phase transition temperatures shift as the stress and environmental conditions change.

The process is distributed and thereby phase transition is not uniform along the SMA wire.

As mentioned previously, these difficulties are managed with various nonlinear control methods with detailed models of the SMA phase transition. But the models are not reliable and require knowledge of accurate parameter values.

Prior art U.S. Pat. No. 5,763,979 controls multiple independent SMAs by implementing a matrix actuation system. The SMAs are put into a matrix, and based on a row and column input, a computer pulses current to a specific segment for actuation. They emphasize that this reduces the amount of wiring to actuate a large number of SMA elements. They independently actuate specific segments but those segments are not put in series to create a linear actuator. Their claim is based around reducing the number of wires in an application that uses many shape memory alloys but not any application or purpose.

Prior art U.S. Pat. No. 6,574,958 is a displacement amplifying binary actuator. Their invention puts many SMA geometrically in parallel and electrically in series. Only two discrete displacements can be created by this invention, like most of other SMA related inventions.

Prior art U.S. Pat. No. 6,133,547 regards using numerous thermoelectric modules to heat and cool a sheet of SMA. By turning on thermoelectric modules, the local shape changes, and thus the overall shape of the sheet is altered. This invention does not create a linear displacement.

Prior art U.S. Pat. No. 4,553,393 puts SMA elements mechanically in parallel for the effect of controlling the force that is applied to the linear displacement output. In addition, this invention utilizes Peltier elements for decreasing the time it takes the SMA to cool down. This invention utilizes multiple SMA elements to control force, not displacement.

Shape memory alloy actuators found in the prior arts are generally for switching, or they are to be controlled as a whole. There is a need to use SMA actuator as a linear actuator that can control the displacement easily. Because the prior art devices rely on the nonlinear relationship between the temperature and the length of the SMA wire, the accuracy of the control will be degraded when there is a load change during operation. Also when controlling the displacement using resistance or displacement of the actuator, the temperature of the wire can increase to very high temperature, which will degrade the actuator and make the actuator unusable. Also, in order to maintain a certain state, the actuator has to be provided with a constant amount of energy, or the state will fluctuate due to the hysteresis inherent in the shape memory alloy. This is why most of the SMA actuator applications are limited to switching, rather than creating a continuous displacement.

SUMMARY OF INVENTION

It is therefore an object of the present invention to improve displacement control of the SMA actuators and other active material based actuators.

It is further object of the present invention to improve the robustness of the control when there is a load disturbance.

It is further object of the present invention to simplify the control of the SMA actuators and other active material based actuators.

Another object of the present invention is to provide easy means of controlling multiple linear actuators with a simple control.

In one aspect of the present invention, the invention is directed to a linear actuator which includes a shape memory alloy(SMA) actuator, which changes length upon application of a temperature change, where one end of the SMA actuator is fixed to a structure while the other end moves freely according to length change. Multiple number of heating elements is used instead of heating the whole actuator as a whole.

Shape memory alloy actuator is slidably sandwiched between the heating segments and a backing plate. The backing plate with a groove for the shape memory alloy to move around maintains contact between the actuator and the heating segments. A control device selectively changes the temperature of each of the heating segments into predetermined temperatures. The two basic predetermined temperatures are temperatures for reducing the length (hot temperature) and temperature for increasing the length (cold temperature) of the SMA actuator.

The displacement created by the present invention is multiple discrete points, that can be designed by changing the length of the heating segments. In one embodiment, the lengths of the heating segments are equal, and hence the displacement created by turning on each heating segment is equal.

In one embodiment, the control device includes a thermocouple for measuring the temperature of each segment independently.

In one embodiment, heating segments are thermoelectric devices using a peltier effect. The thermoelectric device increases temperature when the electric current flows in one direction and decreases temperature when the electric current flows in opposite direction through the device. The thermoelectric device can be used for both heating and cooling.

The active cooling allows faster cooling of the SMA actuator.

In another embodiment, the heating segment is a strip heater.

In one embodiment, the backing plate is a plastic for insulating heat.

In one embodiment, instead of using plastic as a backing plate, thermoelectric devices can be used in both sides of the SMA actuator. It creates symmetrical heating and cooling.

In another embodiment, multiple of these SMA actuators can be used to create a multi-axis actuator array for providing a single actuator system with multiple outputs. Multiple number of shape memory alloy actuators are sandwiched between array of heating segments on one side, and single large backing plate with grooves on the other side.

The invention provides multiple stepper-like actuators that can create discrete positions in a single package with a simple On-Off control for creating different displacements.

Instead of using independent heating segments for the multi-axis embodiment, heating segments can be coupled together thereby changing the temperature of multiple SMA actuators at once. Although this will reduce the independence of each actuator, number of drivers needed to control the multi-axis actuator can be reduced. In another aspect, the present invention is directed towards a method for using a shape memory alloy actuator for providing discretely controlled displacement comprising: i) providing a shape memory alloy actuator, said shape memory alloy actuator changing length upon application of a temperature change to said shape memory alloy actuator, one end of said shape memory alloy actuator fixed to a structure and the other end moves freely according to length change of said shape memory alloy actuator, creating a controlled displacement at the free end ii) providing a plurarity of heating segments for changing temperature of said shape memory alloy actuator iii) providing a backing plate to maintain contact between said shape memory alloy actuator and said heating segments iv) sandwiching said shape memory alloy actuator slidably between said heating segments and said backing plate while said shape memory alloy maintains contact with said heating segments v) providing a control device for selectively changing the temperature of each of said heating segments into predetermined temperatures, where there are predetermined temperatures for reducing the length and increasing the length of said shape memory alloy actuator vi) switching the temperature of each of said heating segments to said predetermined temperatures according to the displacement needed to be created by said shape memory alloy actuator. The displacement of said shape memory alloy actuator is discrete and can be controlled digitally by activating different number of heating segments.

In one embodiment, the control device includes a thermocouple for measuring the temperature of said segment.

In one embodiment, the heating segment is a thermoelectric device which increases temperature when the electric current flows in one direction and decreases temperature when the electric current flows in opposite direction through the thermoelectric device, whereby cooling as well as heating can be actively done with said heating segment.

In one embodiment, the heating segment is a strip heater.

In one embodiment, the backing plate is a plastic.

In one embodiment, the lengths of the heating segments are all equal.

In one embodiment, the backing plate is a thermoelectric device and identical to the heating segment, which is also thermoelectric device.

In another embodiment, multiple of these SMA actuators can be used to create a multi-axis actuator array for providing a single actuator system with multiple outputs. Multiple of shape memory alloy actuators are sandwiched between array of heating segments on one side, and single large backing plate with grooves on the other side.

In another embodiment, the heating segments are coupled to each other, activating more then one SMA actuator.

One way of operation includes performing two modes of operation for each of the heating segments. This operation is possible with the embodiment that uses thermoelectric devices as the heating segments.

To decrease the displacement, a current is applied to the heating segment to cause a temperature change in the heating segment to increase to a predetermined hot temperature. Upon reaching the hot temperature, it immediately decreases to a predetermined intermediate cold temperature and maintains the intermediate cold temperature. Although the temperature is reduced, the length of the actuator will remain the same as when it reached the hot temperature. This is due to the nonlinear aspect of the SMA actuator. This will reduce the energy needed in operation, since lower temperature in maintaining the length means less energy required.

To increase the displacement, the thermoelectric devices are cooled to a predetermined cold temperature and upon reaching the cold temperature, the temperature is brought back to intermediate hot temperature.

Another reason for using the intermediate temperatures is to increase the speed of response of the actuator.

Another way of operating the invention is to coordinate the selection of heating segments to be activated depending on the current status of the segments, wherein:

in a first status, the temperature of said heating segment has not reached said intermediate temperature, thereby cannot be activated, and in a second status, the temperature of said heating segment has reached said intermediate hot or cold temperature, thereby ready to be activated, whereby said coordination decreases the delay time of displacement change of said shape memory alloy actuator.

In one operation, the intermediate cold temperature and the intermediate hot temperatures are equal to the surrounding temperature, thereby not requiring energy to maintain the state.

Hence, the invention is directed to a new approach of controlling the displacement of shape memory alloy actuator and other active material based actuators. By segmenting the actuator material and controlling each segment in a binary manner, the control of the actuator becomes a simple "On-Off" control of each segment, and the resultant motion is a sum of segments that are "On". The invention is further expanded to multi-axis case, where multiple of SMA actuators are put in parallel and the heating segments are coupled to produce coordinated motion and reduce the number of segments needed.

DETAILED DESCRIPTION

Overview

The current invention is based around a digital approach to the design and control of SMA actuator systems as an alternative to the contemporary analogue counterparts. Instead of controlling the phase transition of the entire SMA wire as a single plant as it is traditionally done, the wire is divided into many segments and control each phase transition separately with heating segments. (see FIG. 1) Furthermore, we control each segment's phase in a binary mode with two temperature thresholds: one hot and one cold; each ensures a complete transition to the austenite and martensite phase, respectively, despite varying stress and other disturbances. The aggregate displacement of the entire SMA wire is proportional to the total length of the segments in the austenite phase. Since binary phase control exploits the saturation behavior and not the analogue range of the complex thermomechanical characteristics, the control of individual segments is straightforward, yet it brings about accurate discrete position control despite disturbances and changing loads. This control scheme is called Segmented Binary Control (SBC).

In one embodiment, Segmented Binary Control (SBC) is implemented using an array of thermoelectric devices (TED) for locally heating and cooling the SMA segments. Furthermore, innovative architecture is invented for multi-axis array actuators by laying multitude SMA wires on a large two-dimensional array of TEDs and subdividing them into smaller arrays so that many axes of motion may be coordinated and streamlined. Moreover, two-dimensional segmentation effectively reduces the number of independent control loops needed for controlling the phase of individual SMA segments. This two-dimensional, solid-state SMA array, together with two-dimensional segmented binary control, will provide a robot designer with a powerful methodology for physical embodiment of a highly flexible actuator.

Segmented Binary Control

Figure 1:
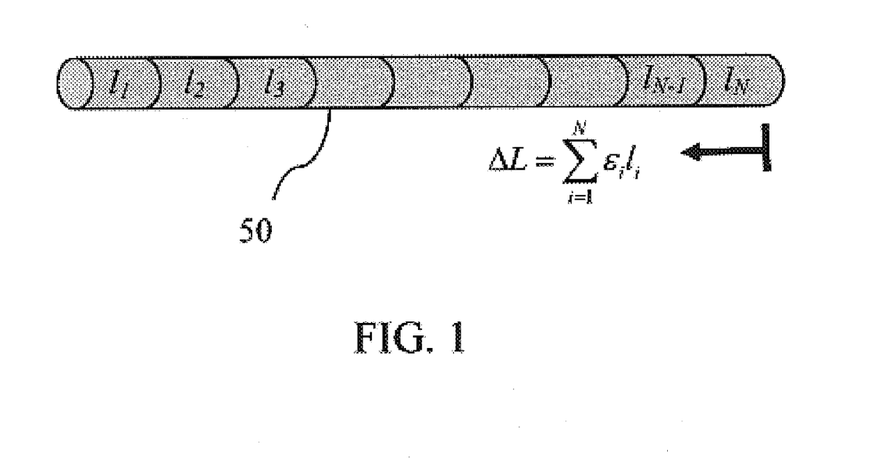
FIG. 1 is a schematic diagram of shape memory alloy actuator divided into several segments for segmented binary control

Segmented Binary Control is an alternative to the existing dynamic compensation methods to independently control the SMA segments with a simple control law for each. To control the output displacement of a SMA wire, the existing methods use some analogue property of SMA, e.g. the ratio of austenite/martensite phase. In contrast, our approach, called Segmented Binary Control, is a digital approach based on the following concepts:

Segmentation. Instead of treating the entire SMA wire as an aggregate single process, the wire is divided into a multitude of segments that are controlled separately, as shown in FIG. 1.

Figure 2:
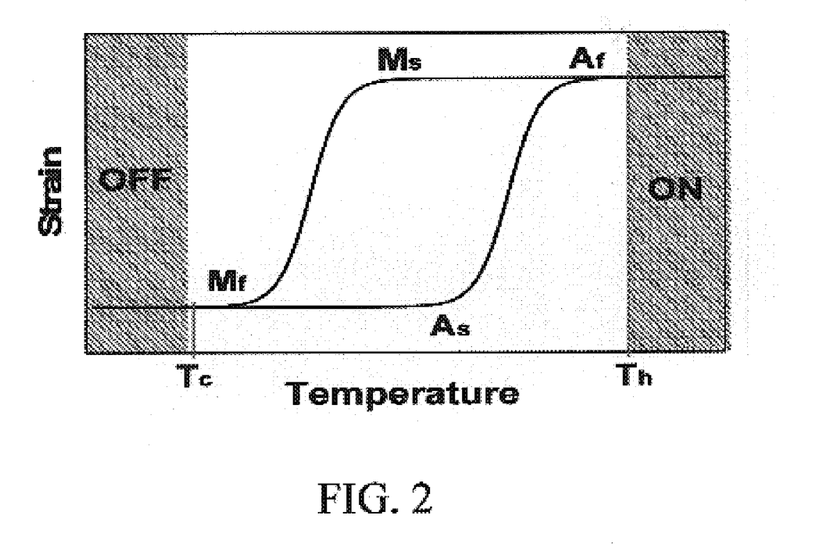
FIG. 2 is a graph that shows relationship between temperature and strain of shape memory alloy actuator.

Binary Control The individual SMA phase transition is controlled in a binary manner. By manipulating every temperature to either the binary hot or binary cold temperature, $T_H$ or $T_C$, each segment of a SMA wire will be in either the austenite phase ("ON") or the martensite phase ("OFF"), as shown in FIG. 2.

Combining segmentation and binary control concepts creates a new digital control approach to SMA: Segmented Binary Control (SBC). For each segment turned "ON", it will contract some percentage of its length. The resultant displacement of the entire wire is determined by the addition of small displacements created at each individual segment. If all segments are equal length, by specifying the number, say n, of "ON" segments (austenite, hot segments), it will contract n units, where a unit depends on the length of the segment (see FIG. 1). Thus, SBC converts SMA to something synonymous with a stepping motor.

SBC uses two basic characteristics of SMA wires. First, the resultant motion, i.e. displacement at one end of the wire, is the integration of the strain along the whole wire. However, the strain does not have to be distributed uniformly as is traditionally done when the SMA wire acts as a single plant. Instead, like in SBC, the strain is generated at select segments and the resultant position is the summation of individual displacements. In other words, the same total displacement can be generated with selective heating and cooling of local segments as in heating the SMA as a single plant. Second, SBC uses SMA saturation behavior in phase transition, i.e. the two flat levels of strain in FIG. 2. Instead of using the steep portions of the temperature-strain curves, which are depended on loading and environmental properties, SBC uses the bi-stable nature of the material. Consequently, SBC needs only a very simple model of the thermomechanical behavior. Like other digital devices SBC exploits the high fidelity and robustness of digital devices: it is insensitive to complex nonlinearity and varying hysteresis.

Furthermore, segmented control provides a multitude of degrees of freedom (DOF) in controlling the total displacement over a single SMA wire. The system is hyper-redundant, since individual segments can take diverse states to produce the same output displacement. Exploiting the multitude DOF create unique features for SMA, which would be unattainable with the traditional single process control. We will explore such unique features in the following sections.

EMBODIMENTS

Figure 3A:
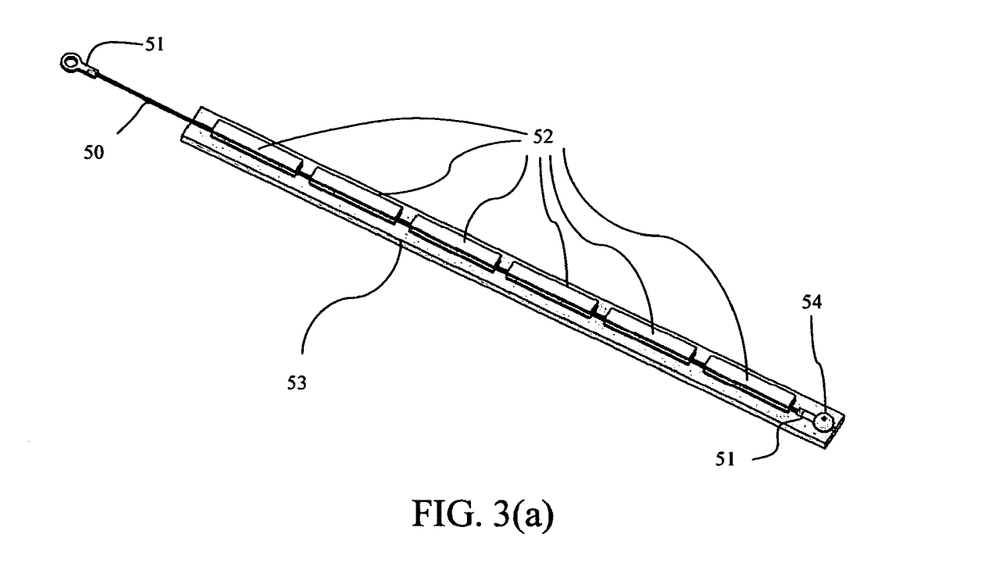
FIG. 3 is a perspective view of preferred embodiment of the invention using thermoelectric device for heating segment and plastics for backing plate.
Figure 3B:
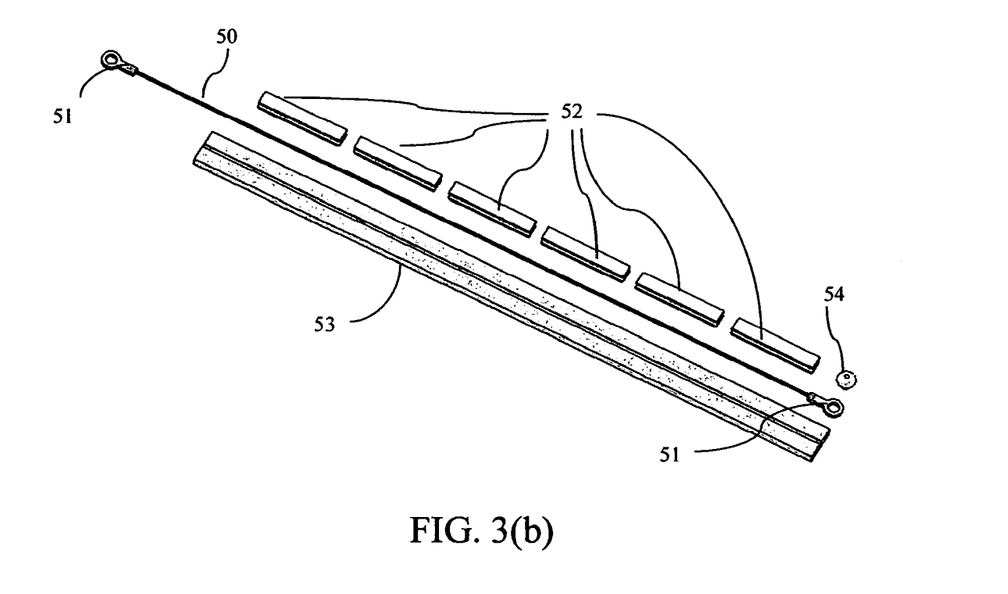
Figure 6:
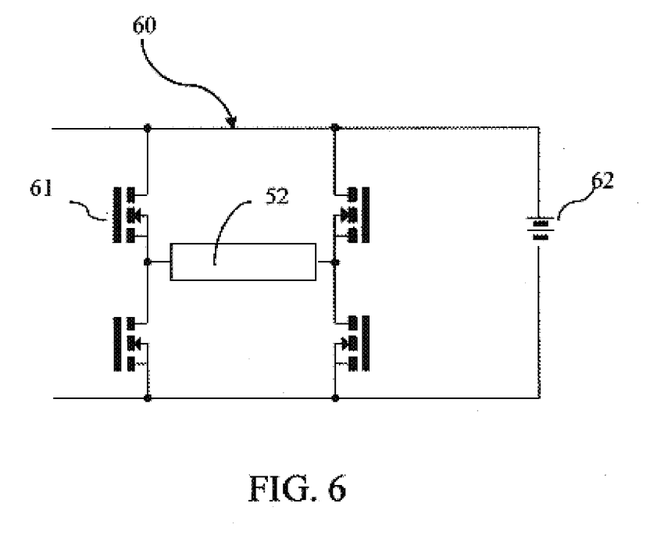
FIG. 6 is a schematic diagram of H-bridge driver circuitry used to drive current into the thermoelectric device

FIG. 3 shows the preferred embodiment of the actuator. FIG. 3(b) is a exploded view of FIG. 3(a). This embodiment uses thermoelectric devices 52 as the heating segments and plastics 53 as a backing plate. Backing plate can be made of acrylic board, grooved with a depth of 0.01 inch using laser cutter. Other means of grooving can be used, like milling. The SMA actuator 50 is first crimped with ring terminal 51 at both ends. The ring terminals provide means to connect one end of the SMA onto the backing plate, thereby fixing one end, and connect the other end on to any mechanical member that we are trying to control the displacement of. Thermal adhesive tapes(not shown in the figure) are used to attach the thermoelectric device 52 to the backing plate 53. The depth of the groove has to be carefully controlled to keep the thermoelectric device 52 in good contact with the SMA actuator 50. The current can be provided to the thermoelectric device using H-bridge 60 as shown in FIG. 6, which is a common way of providing current in both directions. Four MOSFETs 61 are used for each H-bridge 60. The MOSFETs 61 are connected to battery 62 and thermoelectric device 52. One H-bridge 60 is required for each thermoelectric device to control each thermoelectric device separately.

Figure 7:
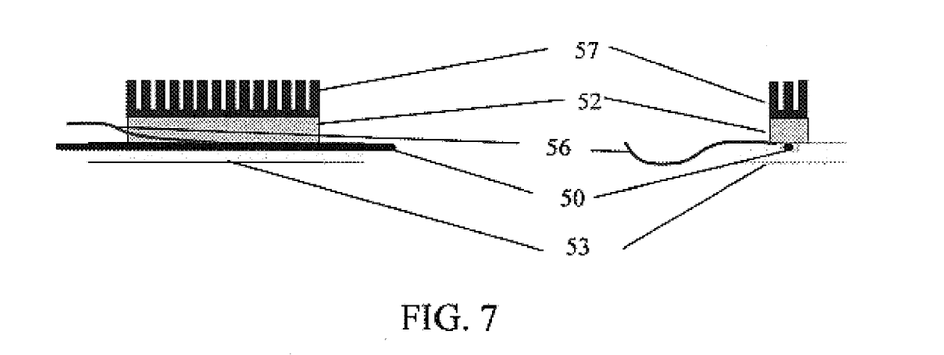
FIG. 7 is a schematic diagram of thermocouple embedded in between the thermoelectric device and the backing plate.

FIG. 7 shows another embodiment that uses thermocouple 56 for measuring the temperature of the thermoelectric device 52. The temperature of the device can be controlled by driving current into the thermoelectric device using the H-bridge 60.

Figure 4A:
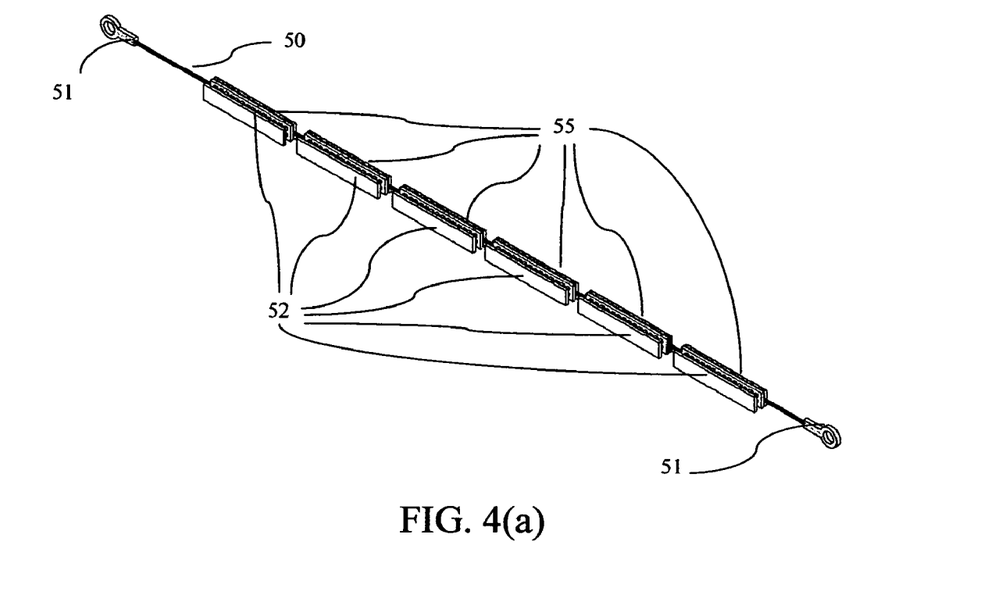
FIG. 4 is a perspective view of the second embodiment of the invention using heating strip and thermoelectric device.
Figure 4B:
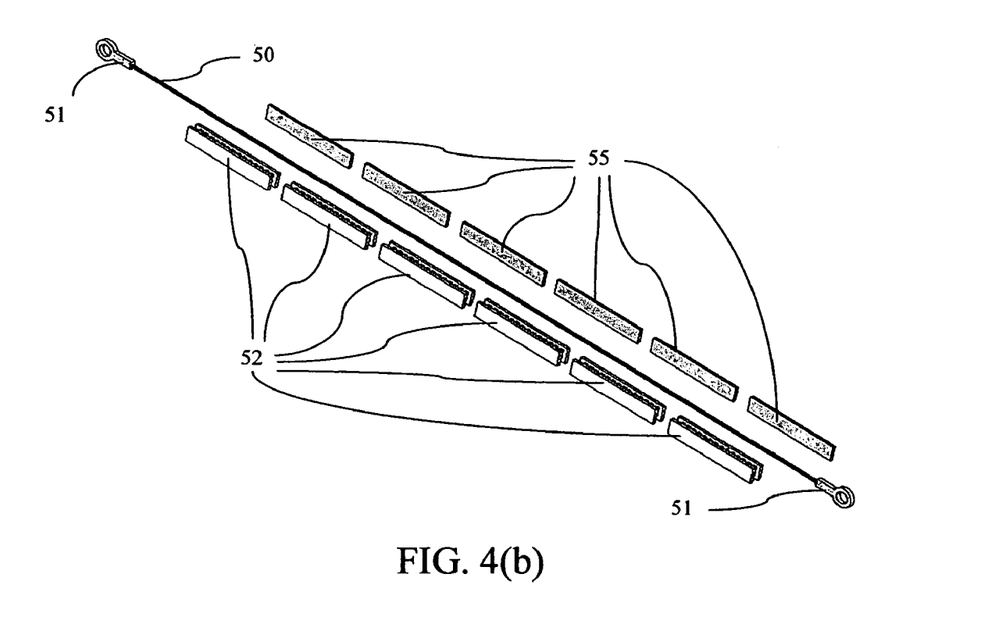

FIG. 4 shows another embodiment of the actuator. FIG. 4(b) is a exploded view of FIG. 4(a). This embodiment uses heating strip 55 which uses simple resistive heating for increasing the temperature of the SMA actuator 50. Thermoelectric devices 52 are used as a backing plate. This thermoelectric device is used to enhance the cooling of the SMA actuator 50. The SMA actuator 50 is first crimped with ring terminal 51 at both ends. The ring terminals provide means to connect one end of the SMA onto the backing plate, thereby fixing one end, and connect the other end on to any mechanical member that we are trying to control the displacement. The current can be provided to each heating strip 55 and thermoelectric device 52 using MOSFET. There is no need to change the direction of the current so the H-bridge 60 is not necessary.

Figure 5A:
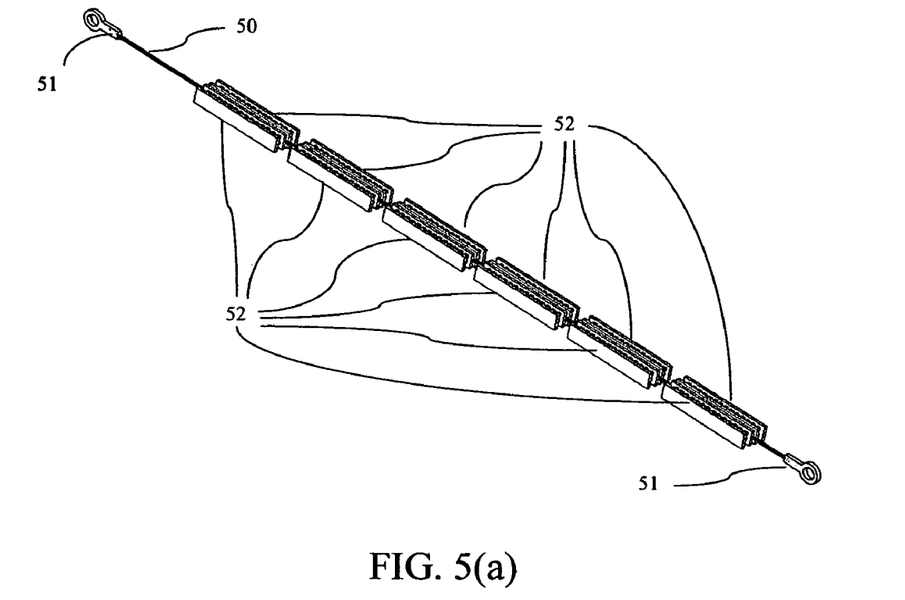
FIG. 5 is a perspective view of the third embodiment of the invention using two layers of thermoelectric devices
Figure 5B:
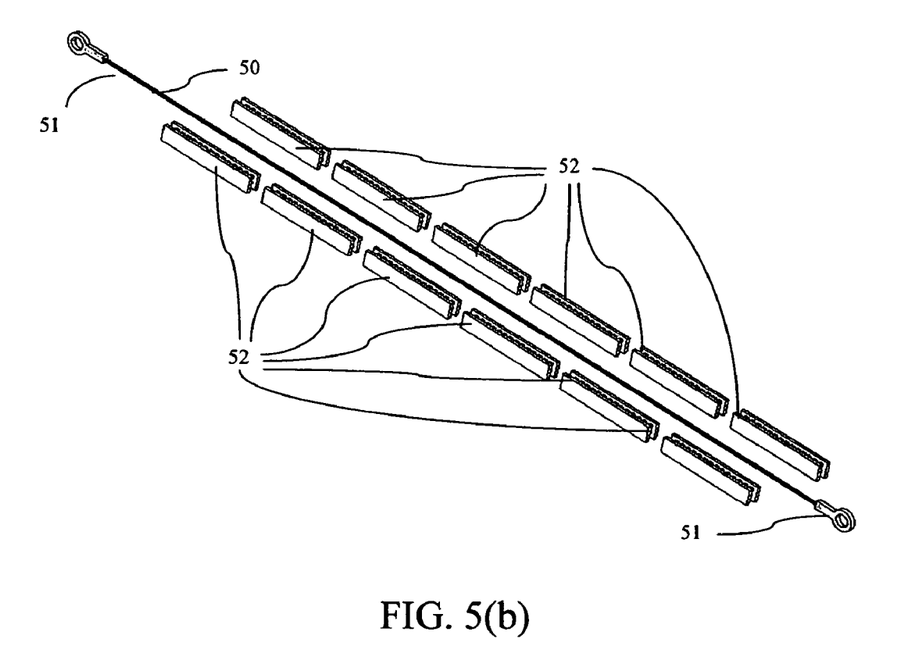

FIG. 5 shows another embodiment of the actuator. FIG. 5(b) is a exploded view of FIG. 5(a). This embodiment uses thermoelectric devices 52 as the heating segments and backing plate. Instead of using plastics for backing plate, thermoelectric device 52 is used, providing heating and cooling from both sides of the SMA actuator 50. SMA actuator 50 is first crimped with ring terminal 51 at both ends. The ring terminals provide means to connect one end of the SMA onto a structure, thereby fixing one end, and connect the other end on to any mechanical member that we are trying to control the displacement of. Thermal adhesive tapes(not shown in the figure) are used to attach thermoelectric devices onto each other. The gap between the two thermoelectric devices should be carefully controlled to keep the thermoelectric device 52 in good contact with the SMA actuator 50. The current can be provided to the thermoelectric devices using H-bridge 60 as shown in FIG. 6, which is a common way of providing current in both directions. Four MOSFETs 61 are used for each H-bridge 60. The MOSFETs 61 are connected to battery 62 and thermoelectric device 52. One H-bridge 60 is required for each thermoelectric device to control each thermoelectric device separately.

Multi-Axis SMA Array Actuator

Now that we have presented SBC of a single axis SMA wire, let us consider multi-axis array SMA actuators under SBC. One drawback of SBC is complexity of the control and drive system. Although each control loop regulating the phase of an individual segment is rather simple, many loops are needed. SBC may not be useful nor can practically be justifiable, if it entails many feedback loops for controlling individual segments of each axis.

Since the SMA wire is digitized under SBC, the resolution of the output displacement depends on the number of segments. If the entire wire is segmented equally in length, as in the case of FIG. 1 the length of each segment is given by $l=L/N$, where L is the length of the wire and N is the number of segments having an equal length. The resolution is then $\eta = \bar{\epsilon} \cdot l$, where $\bar{\epsilon}$ is target strain, typically 4% for NiTi SMA wire.

Figure 8:
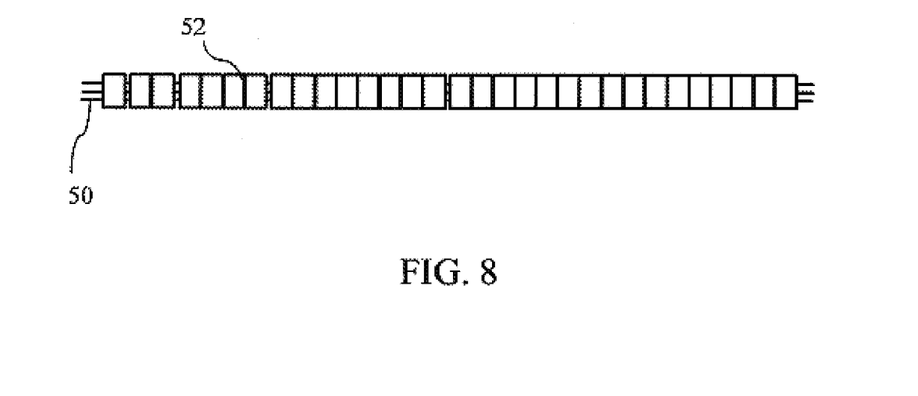
FIG. 8 is a schematic diagram of example of an embodiment of the actuator with reduced number of segmentation for a single axis case

If N is given by $N = \text{sum of } (2^i)$ from $i=0$ to $b$, the total of b control loops can provide the same resolution $\eta$. As shown in FIG. 8, the length of each segment is set to be 1, 2, 4, 8, ..., of the unit length l and an independent control loop is assigned to each segment with a different unit length. Then the b control loops can generate any number of units turned to be in either $T_H$ or $T_C$ state. With this segmentation, the number of control loops can be minimized for a single axis SMA actuator.

Figure 9:
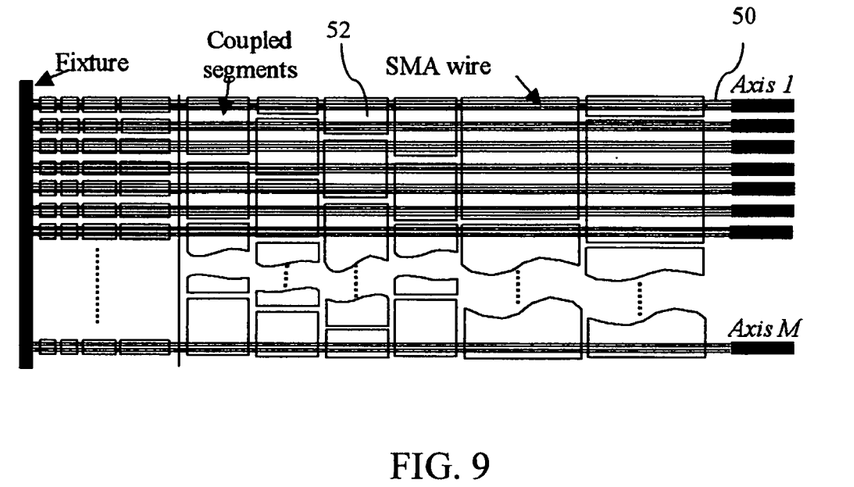
FIG. 9 is a schematic diagram of multi-axis SMA array actuator

When we consider M-axis actuators, the number of control loops becomes M times b, and that is too many to practically implement. Interestingly, however, there is an effective method of reducing the control loops for multi-axis SMA actuators. As illustrated in FIG. 9, M-axes of SMA wires are laid on a two-dimensional array of thermoelectric device, called TED bed. Note that this two-dimensional TED bed is segmented not only in the longitudinal direction of each bundle of SMA wires but also in the transverse direction. Therefore adjacent SMA wires that lay on the same segment of the thermoelectric device are heated or cooled at the same time for that particular portion of the wires. This, of course, reduces independence of the adjacent SMA wires to a certain degree, but on the other hand generates a coordinated movement among them. It is also important to note that with this two-dimensional segmentation, the number of control loops is significantly reduced.

Figure 10:
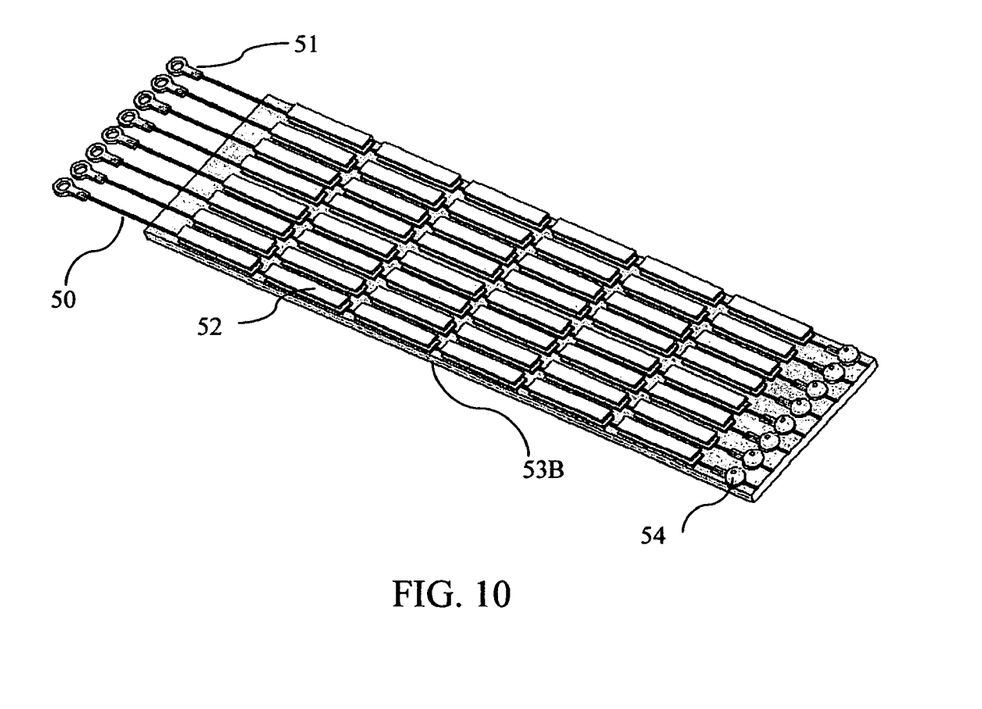
FIG. 10 is a perspective view of the preferred embodiment of the multi-axis actuator array

FIG. 10 contains schematic of the preferred embodiment of the multi-axis SMA array actuator. This embodiment uses thermoelectric devices 52 as the heating segments and plastics 53B as a backing plate. One large backing plate is used for all eight SMA actuators 50. This plate is made of acrylic and grooved with a depth of 0.01 inch using laser cutter. Other means of grooving can be used, like milling. The SMA actuators 50 are first crimped with ring terminals 51 at both ends. The ring terminals provide means to connect one end of the SMA onto the backing plate using a bolt 54, thereby fixing one end, and connect the other end to any mechanical member that we are trying to control the displacement of. Thermal adhesive tapes (not shown in the figure) are used to attach the thermoelectric device 52 to the backing plate 53. The details of this embodiment is based on the embodiment shown in FIG. 3

The design concept of multi-axis array actuators with two-dimensional segmentation architecture is applied to an anthropomorphic robot hand. A single human hand has 19 joints at the five fingers alone. Despite numerous degrees of freedom, many of them are coupled, as mentioned previously. Such coupled motion can be generated effectively with use of multi-axis segmentation architecture.

Behavior of human fingers has been studied in the robotics and biomechanics communities for years. Okada characterized human grasp and manipulative behavior and classified various poses into seven groups. Cutkosky also showed an example of grasp taxonomy for manufacturing tasks. More recently, human finger postures have been studied extensively in the field of human-computer interaction (HCI). To better understand hand gestures from visual images and other sensor data, anatomical and kinesiological constraints among multiple joint axes are used for eliminating unnatural poses and physiologically infeasible poses. Such constraints greatly reduce the search space. Like-wise, the reduction in the space of natural poses helps us reduce the number of segments of a multi-axis actuator array for driving an anthropomorphic robot hand.

Figure 11:
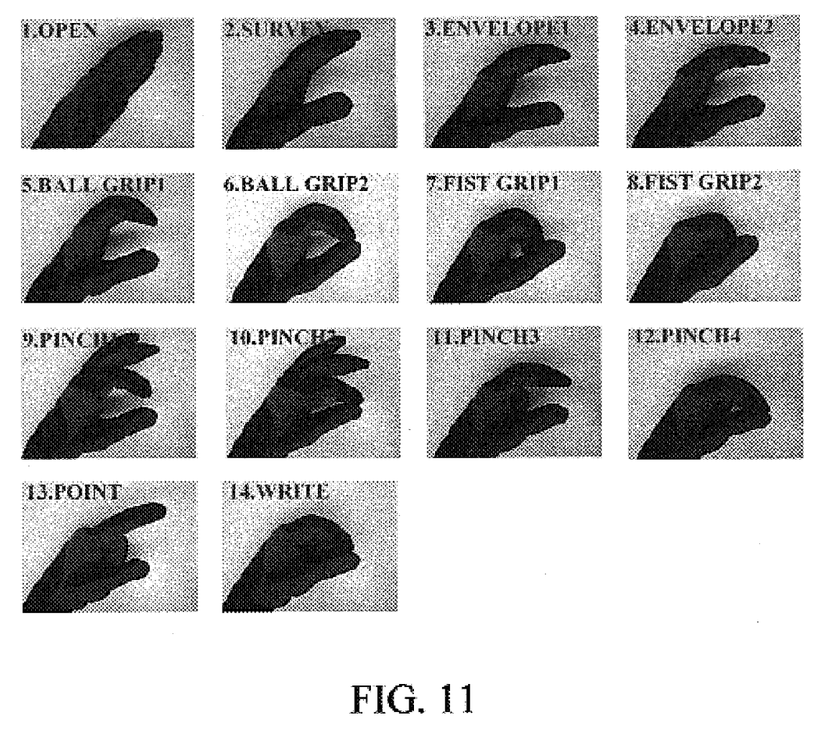
FIG. 11 is an image of fourteen different hand postures that can be performed by the actuator of FIG. 13

FIG. 11 shows fourteen hand postures that span the useful range of human hand motions. For these postures, finger joint angles can be derived, and an actuator array can be designed such that the joint angles of all the postures may be generated with the minimum number of segments. These joint angles are transformed into displacements of the actuators driving the individual joints. To implement segmented binary control, the displacements must be discretized and the resolution of actuator axes must be determined accordingly.

Figure 12:
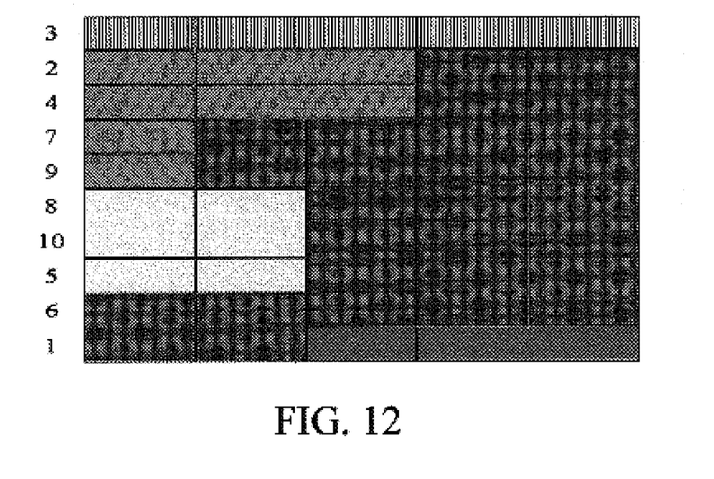
FIG. 12 is a schematic diagram of the segmentation design for multi-axis SMA actuator array that can perform all the hand postures shown in FIG. 13 when connected to a robotic hand.

FIG. 12 shows the segmentation design for the multi-axis SMA array actuator that can produce all the desired motions for hand postures shown in FIG. 11 with minimum number of segments.

Figure 13:
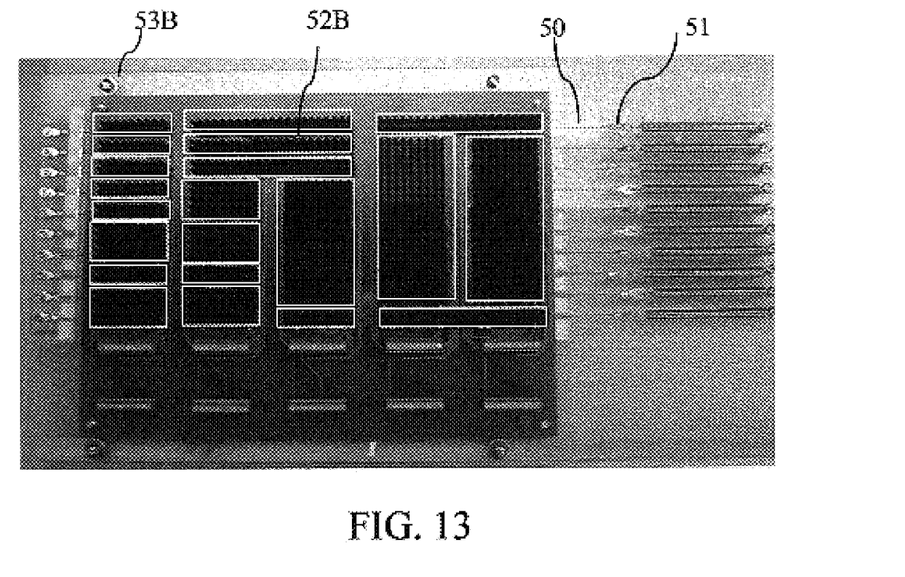
FIG. 13 is an image illustrating a multi-axis SMA array actuator with a segmentation architecture for driving anthropomorphic robot hand

FIG. 13 shows an image of an embodiment of the multi-axis SMA array actuator with a segmentation structure shown in FIG. 12.

Operation

Figure 14:
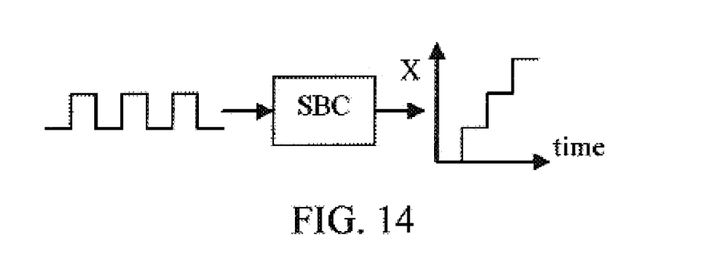
FIG. 14 is a schematic diagram that shows the essence of segmented binary controlled approach for controlling displacement of SMA

An alternative to the existing complex nonlinear control for compensation for SMA difficult thermomechanical behavior (FIG. 2) methods is to independently control SMA segments with a simple control law for each. Segmented Binary Control, is a digital approach similar to a stepper motor as shown in FIG. 14. Each segment is controlled to be only at the predetermined temperatures, rather than any analogous temperature. This produces discrete displacement at one end of the actuator when each segment is turned "ON". By controlling which segments and how many of the segments are turned "ON" displacement of the actuator is controlled. Turned "ON" means that the temperature of the segment is at the predetermined hot temperature. New operation method according to the invention, incorporating two additional intermediate, user-defined temperatures that segments are maintained at until an input command is given to change states is presented in this section. The four user specified temperatures are:

Hot Temperature ($T_H$) The temperature that the SMA must reach temporarily to ensure the expected contraction. This is the same as in the basic SBC.

Intermediate Cold Temperature ($T_{HC}$): The temperature that the SMA must reach after reaching TH before transitioning to $T_C$.

Cold Temperature ($T_C$): The temperature that the SMA must reach after THC to ensure the expected relaxation of the SMA. This is the same as in the basic SBC.

Intermediate Hot Temperature ($T_C$): The temperature that the SMA must reach after reaching $T_C$ before transitioning to $T_H$.

Figure 15:
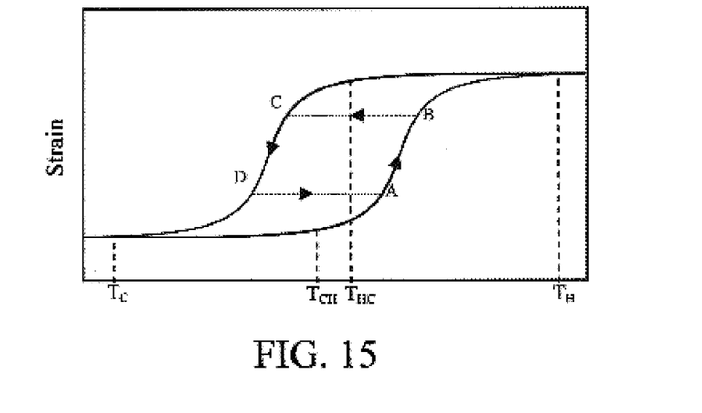
FIG. 15 is schematic diagram that shows strain-temperature relationship of typical SMA actuator with four predetermined temperatures labeled on them.

These "hold" temperatures are shown in FIG. 15 along with the hot and cold threshold temperatures.

With these hold temperatures the control of each segment is performed in the following manner:

When a segment is instructed to change to the "on" state from the "off" state, heat the segment from the temperature $T_{CH}$ to $T_H$ and then immediately cool down to $T_{HC}$.

When a segment is instructed to change to the "off" state from the "on" state, cool the segment from the temperature $T_{HC}$ to $T_C$ and then immediately heat up to $T_{CH}$.

This strategy utilizes the Schmidt-Trigger type bi-stable switching characteristics of SMA, and makes a prompt recovery from every phase transition. Note that this strategy would not work if SMA had no hysteresis in its strain-temperature diagram. Because of the hysteresis inherent in SMA we do not have to keep the extreme temperatures, high or low, to maintain the current phase of a SMA segment. In contrast to the prior arts which strive to eliminate the effect of hysteresis, this control strategy exploits the hysteresis. In this paper we call this control method Hysteresis Loop Control (HLC) to differentiate it from the basic SBC.

Figure 16:
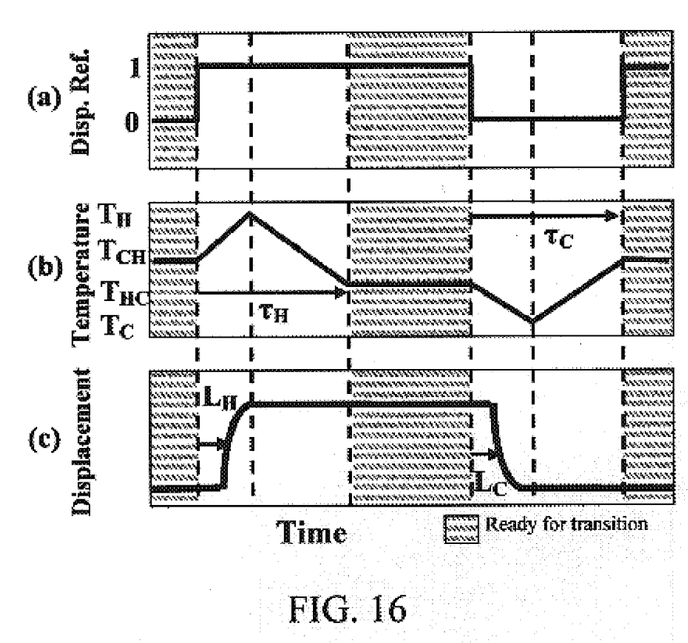
FIG. 16 is a schematic diagram showing the operation of the actuator using hysteresis loop control

FIG. 16 shows a complete position cycle for a segment when HLC is used. Note that once the temperature has reached $T_H$ and $T_C$, it is immediately pulled back to the intermediate temperatures, $T_{HC}$ and $T_{CH}$, respectively. Note also that the displacement begins to change soon after the command signal changes, since the intermediate temperatures, $T_{HC}$ and $T_{CH}$, are set to be close to the transition start temperatures $A_S$, and $M_S$, respectively. Therefore, the latency times, $L_C$ and $L_H$, are significantly improved with the hysteresis loop control.

Furthermore, HLC will save power since extreme temperatures, $T_H$ and $T_C$, are needed only for a short time. Power is saved by reducing the extreme temperatures to the intermediate ones closer to room temperature and keeping them at those levels until commands are given to change states. In particular, if both intermediate hold temperatures, $T_{HC}$ and $T_{CH}$, are close to the ambient temperature, virtually no power is needed to keep SMA at the same state. Power is consumed only when a transition is made. In consequence, the same output displacement may be held for a fixed load even after power has been shut off.

Another mode of operation according to the invention is a zero latency control. The Hysteresis Loop Control (HLC) can substantially eliminate the latency times for state transition. In HLC the temperature is pulled back to an intermediate hold temperature, so that next phase transition can be executed without delay. If the hold temperature is on the verge of state transition, the command for the next state transition will immediately produce displacement with no latency time. This will not only resolve the major drawback of large latency times in SBC but would also achieve even faster response than traditional analog controls do given appropriate materials.

Figure 17:
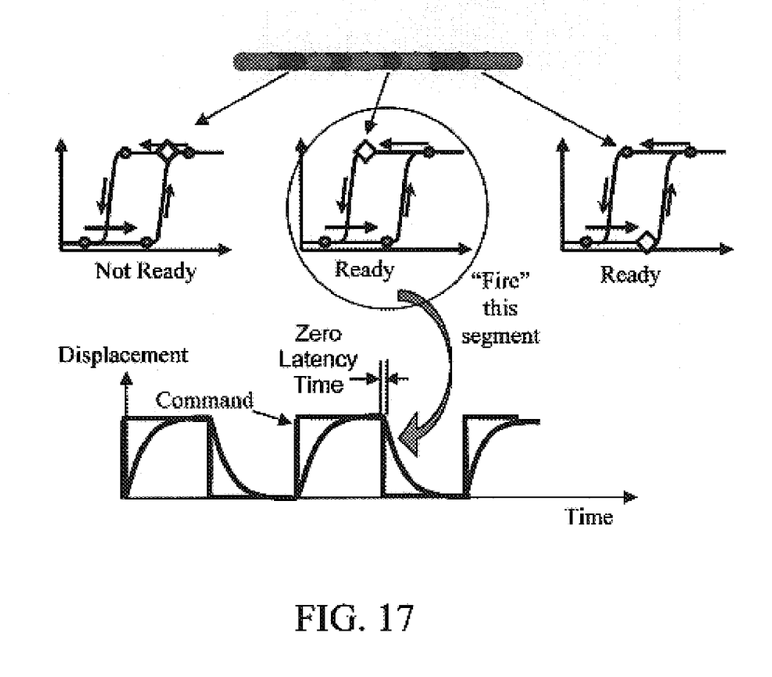
FIG. 17 is a schematic diagram showing the states of different segments during operation.

FIG. 17 illustrates that, in the segmented control architecture, individual segments may take diverse states. Segment 2 in FIG. 17, for example, has just made a phase transition to $T_H$ and its temperature is being pulled back towards $T_{HC}$, as shown in the strain-temperature diagram on the left hand side. The next segment, on the other hand, has made a transition some time ago and the temperature has already changed to $T_{HC}$. It is this segment that can immediately execute the next command to transition down. For the cyclic trajectory, the backward motion may be generated by segments that are different from those responsible for the forward motion from A to B. Although those segments used for the forward motion are still at a high temperature state ($T_H$) when arriving at point B, other groups of segments, at the intermediate hold temperature ($T_{HC}$), are ready for phase transition. As shown in FIG. 16, the backward motion can be created with no latency time by activating those segments at "ready state".

This selective activation is made possible only because of the segmented control architecture. The traditional approach based on a single state-transition model cannot eliminate the latency time, since it can control merely the single state that must transverse the wide hysteresis band in order to change the direction of motion. HLC with selective activation exploits the extra control freedom involved in the multitude of segments for overcoming the latency time problem.

The effect of this method will be more significant for thicker SMA wires, for which the traditional approach is particularly difficult in coping with the long latency time problem. It is expected that this selective activation method along with HLC will allow us to use thick SMA wires while minimizing latency times.

Figure 18:
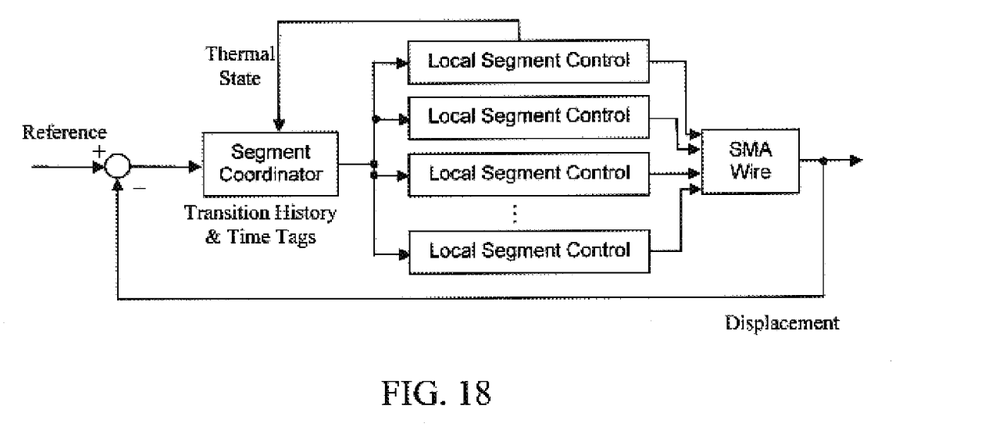
FIG. 18 shows the block diagram of control system

FIG. 18 shows the overall control system, consisting of a global control and local segment controls. The outer feedback loop is position feedback from a position transducer measuring the total displacement of the SMA wire. It is compared with a reference position and the difference is fed to the segment coordinator. A simple criterion can be used for the segment coordinator to select an optimal segment to trigger. For example, among all the segments in "Ready $T_{CH}$" state the segment coordinator can select the one that has been in the ready state for the longest time. To implement this First-In-First-Out algorithm, the control system must keep track of transitions of individual segments. The transition history may be represented with a time tag attached to each segment indicating when a state transition command was given last time and how long it has been in the current state. Based on the time tag, the segment coordinator generates a trigger signal for the selected segment to initiate state transition. Each local segment control performs simple ON-OFF control based on local temperature measurement and the command from the segment coordinator. If the error of the global feedback is large, the segment coordinator can send triggering commands at a higher frequency. In other words, a type of pulse frequency modulation can be used for the segment coordinator in converting the analogue error signal to discrete commands. This frequency is upper-bounded by the heating and cooling time delays as well as the number of segments involved.

Figure 19:
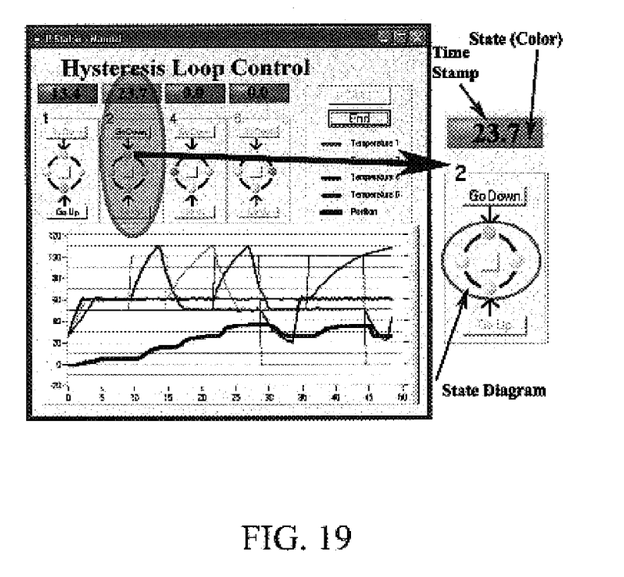
FIG. 19 shows GUI interface of the controller

FIG. 19 shows a graphic user interface used to display the measurements and control signals in real time. The software was designed in Visual Basic and utilized the NI Measurement Studio's active X controls. The control system consists of eight local ON-OFF controllers for the TEM and a global controller coordinating the individual segments. The block diagram of the controller has been shown in FIG. 18.

A screen image of the control GUI indicating the temperatures, states of the individual segments, the total displacement of the entire SMA wire, and the control signal are shown in FIG. 19. Based on the temperature measurement and the time history of commands given to each segment's local controller, the binary state of the segment is shown. The token moving around the discrete state network indicates whether the segment is ready for transition or still in transition to a new state. The segment coordinator selects which segment to fire in order to best follow the displacement command given to the system based on a First-In-First-Out algorithm. The time stamp needed for selection is also shown in the GUI. In this figure, the first element has been ready to transition up for 13.4 seconds; the second has been ready to transition down for 23.7 seconds; and, the third and fourth are not ready for transitions and are in the cold states.

The invention claimed is:

1. A linear actuator comprising:
a shape memory alloy actuator, said shape memory alloy actuator changing length upon application of a temperature change to said shape memory alloy actuator, a first end of said shape memory alloy actuator being fixed to a structure and a second end moving freely in response to length change of said shape memory alloy actuator, creating a controlled displacement at the second end;
a plururity of heating segments for changing temperature of said shape memory alloy actuator;
a backing plate to maintain contact between said shape memory alloy actuator and said heating segments;
said shape memory alloy actuator being slidably disposed between said heating segments and said backing plate while said shape memory alloy maintains contact with said heating segments;
a control device for selectively changing the temperature of each of said heating segments to predetermined temperatures, wherein a first predetermined hot temperature reduces the length and a second predetermined cold temperature increases the length of said shape memory alloy actuator;
wherein the displacement of said second end of said shape memory alloy actuator can be controlled by activating a selectable quantity of heating segments;

wherein the shape memory alloy actuator comprises a material such that the material expands and contracts as the temperature changes.

2. The actuator of claim 1 wherein said control device includes a thermocouple for measuring the temperature of said segment.

3. The actuator of claim 1 wherein said heating segment is a thermoelectric device which increases temperature when an electric current flows in one direction and decreases temperature when the electric current flows in an opposite direction through the thermoelectric device, whereby cooling and heating can be performed with said heating segment.

4. The actuator of claim 1 wherein said heating segment is a strip heater.

5. The actuator of claim 1 wherein said backing plate comprises a plastic for insulating heat.

6. The actuator of claim 3 wherein said backing plate is a thermoelectric device identical to the said heating segments and controlled identically with the heating segment, thereby creating a symmetric heating segment.

7. The actuator of claim 1, further comprising a plurality of said shape memory alloy actuators, said shape memory alloy actuators being placed in parallel to each other.

8. The actuator of claim 7, wherein the heating segment is attached to the plurality of said shape memory alloy actuators thereby changing the temperature of at least a portion of the plurality of said shape memory alloy actuators with a single heating segment.

9. A method for using a shape memory alloy actuator for providing discretely controlled displacement comprising:
   providing a shape memory alloy actuator, said shape memory alloy actuator changing length upon application of a temperature change to said shape memory alloy actuator, a first end of said shape memory alloy actuator being fixed to a structure and a second end moving freely in response to length change of said shape memory alloy actuator, creating a controlled displacement at the second end;
   providing a plurality of heating segments for changing temperature of said shape memory alloy actuator;
   providing a backing plate to maintain contact between said shape memory alloy actuator and said heating segments;
   disposing said shape memory alloy actuator slidably between said heating segments and said backing plate while said shape memory alloy maintains contact with said heating segments;
   providing a control device for selectively changing the temperature of each of said heating segments to predetermined temperatures, wherein a first predetermined hot temperature reduces the length and a second predetermined cold temperature increases the length of said shape memory alloy actuator;
   switching the temperature of each of said heating segments to said predetermined temperatures according to the displacement needed to be created by said shape memory alloy actuator;
   wherein the displacement of said second end of said shape memory alloy actuator can be controlled by activating a selectable quantity of heating segments;
   wherein the shape memory alloy actuator comprises a material such that the material expands and contracts as the temperature changes.

10. The method of claim 9 wherein said control device includes a thermocouple for measuring the temperature of said segment.

11. The method of claim 9 wherein said heating segment is a thermoelectric device which increases temperature when an electric current flows in one direction and decreases temperature when the electric current flows in an opposite direction through the thermoelectric device, whereby cooling and heating can be performed with said heating segment.

12. The method of claim 9 wherein said heating segment is a strip heater.

13. The method of claim 9 wherein said backing plate comprises a plastic.

14. The method of claim 11 wherein said backing plate is a thermoelectric device identical to the said heating segments and controlled identically with the heating segment, thereby creating a symmetric heating segment.

15. The method of claim 9, further comprising a plurality of said shape memory alloy actuators, said shape memory alloy actuators being placed in parallel to each other.

16. The method of claim 15, wherein the heating segment is attached to the plurality of shape memory alloy actuators thereby changing the temperature of at least a portion of plurality of shape memory alloy actuators with a single heating segment.

17. The method of claim 9, further comprising performing two modes of operation for each of said heating segment, wherein:
   in a first mode, a current is applied to the heating segment to cause a temperature change in said heating segment to increase to a predetermined hot temperature and upon reaching said hot temperature, decrease to a predetermined intermediate cold temperature and maintain said intermediate cold temperature, thereby reducing the length of said shape memory alloy actuator and maintaining the length; and
   in a second mode, a current is applied to the heating segment to cause the temperature in said heating segment to decrease to a predetermined cold temperature and upon reaching said cold temperature, to increase to a predetermined intermediate hot temperature and maintain said intermediate hot temperature, thereby increasing the length of said shape memory alloy actuator and maintaining the length.

18. The method of claim 17, further comprising coordinating selection of said heating segments to be activated depending on the current status of the segments, wherein:
   in a first status, the temperature of said heating segment has not reached said intermediate temperature, thereby cannot be activated; and
   in a second status, the temperature of said heating segment has reached said intermediate hot or cold temperature, thereby being ready to be activated,
   wherein said coordination decreases the delay time of displacement change of said shape memory alloy actuator.

19. The method of claim 17, wherein said intermediate cold temperature and said intermediate hot temperatures are equal to the surrounding temperature, thereby not requiring energy to maintain a state.

20. The method of claim 17, wherein the length of said heating segments are all equal.

* * * * *